(12) United States Patent
Lu et al.

(10) Patent No.: US 6,503,297 B1
(45) Date of Patent: Jan. 7, 2003

(54) ADSORPTION PROCESSES

(75) Inventors: Yaping Lu, Scotch Plains, NJ (US); Divyanshu R. Acharya, Bridgewater, NJ (US); Arthur I. Shirley, Piscataway, NJ (US); Norberto O. Lemcoff, Livingston, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/778,253

(22) Filed: Feb. 7, 2001

(51) Int. Cl.[7] ............................................. B01D 53/047
(52) U.S. Cl. ........................... 95/96; 95/106; 95/117; 95/130; 95/138; 95/139; 95/143; 95/902
(58) Field of Search ............................ 95/96–106, 108, 95/117–123, 130, 138, 139, 143, 902; 96/130–132, 143, 144

(56) References Cited

U.S. PATENT DOCUMENTS

| | | | |
|---|---|---|---|
| 3,727,384 A | * 4/1973 | Feldman | 96/131 |
| 4,386,947 A | 6/1983 | Mizuno et al. | |
| 4,964,888 A | 10/1990 | Miller | 55/58 |
| 5,232,479 A | * 8/1993 | Poteau et al. | 86/131 |
| 5,298,226 A | 3/1994 | Nowobilski | 422/171 |
| 5,520,720 A | 5/1996 | Lemcoff | 95/96 |
| 5,746,914 A | 5/1998 | Hanna et al. | 210/266 |
| 5,846,294 A | 12/1998 | Doong | 95/98 |
| 5,906,675 A | * 5/1999 | Jain et al. | 95/99 |
| 5,914,455 A | * 6/1999 | Jain et al. | 95/96 |
| 5,932,509 A | 8/1999 | Balse et al. | 502/65 |
| 5,948,142 A | 9/1999 | Holmes et al. | |
| 6,027,548 A | * 2/2000 | Ackley et al. | 96/132 X |
| 6,086,659 A | * 7/2000 | Tentarelli | 96/131 |
| 6,106,593 A | * 8/2000 | Golden et al. | 95/139 X |
| 6,171,373 B1 | * 1/2001 | Park et al. | 95/143 X |
| 6,231,644 B1 | * 5/2001 | Jain et al. | 95/96 |

* cited by examiner

Primary Examiner—Robert H. Spitzer
(74) Attorney, Agent, or Firm—Philip H. Von Neida; Salvatore P. Pace

(57) ABSTRACT

A process for separating a gas component from a gas mixture is disclosed. A gas mixture is passed through an adsorption zone which contains an adsorbent which will selectively adsorb a gaseous component from the gas mixture. The adsorption zone contains a layer of monolithic adsorbent and a layer of adsorption beads. Optionally, a third monolithic layer may be employed. The adsorption zone is typically contained in an adsorption vessel.

22 Claims, 2 Drawing Sheets

ADSORPTION PROCESSES

FIELD OF THE INVENTION

The present invention provides for adsorption processes using adsorption zones which contain adsorbent beads of different geometrical shapes and sizes and monolithic adsorbents. More particularly the present invention provides for pressure and/or vacuum swing adsorption processes using these adsorption zones.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that includes (i) pressurization of the bed to the required pressure, (ii) production of the product gas at required purity, (iii) evacuation of the bed to a certain minimum pressure, and (iv) purging the bed with product gas under vacuum conditions. In addition a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The nonadsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the nonadsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flow rate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates an ability to produce the required purity of product, with minimum power consumption and lower capital costs.

Monolithic adsorbents offer a number of advantages, particularly low pressure drop which translates into higher power savings. Other advantages include excellent attrition resistance, good mechanical properties, compactness, and no fluidization constraints. Monolith beds have faster mass transfer rates and perform close to equilibrium conditions. However, due to the low pressure drop across monolithic beds, the flow distribution of the feed inside the bed may not be as good as a granular bed. Historically, an empty chamber at the bottom of an adsorbent vessel has been employed to achieve a good flow distribution of feed through the adsorbent layer. However, this may not work with monolith beds since the parallel channels in the monolith are not connected.

Additionally, permeability in the axial direction (i.e. direction of gas flow) in some monolithic beds is quite high and any abnormality in the channels may produce a maldistribution of flow. This leads to process underperformance and may prevent reaching the desired process purity values. This inefficiency may make the use of monolithic beds, which are more expensive than conventional packed beds, less desirable.

The present inventors have discovered bed configurations which will maintain good flow distribution and maintain process efficiency at the same time.

SUMMARY OF THE INVENTION

An adsorption process employing composite beds with adsorbent materials of different geometrical shapes, particle sizes and adsorption properties is disclosed. The process which can be vacuum swing adsorption(VSA), pressure swing adsorption process (PSA) or pressure-vacuum swing adsorption(PVSA) is used to separate oxygen from air or other oxygen-containing gases. The composite bed will typically contain a layer of monolith adsorbent material and a layer of adsorbent beads.

Optimized bed performance is achieved by the configuration and by carefully designing the amount of each type of different size, shape and property of adsorbent material in each layer of the bed. The keys are to achieve reduced pressure drop and maintaining higher product throughput without fluidization and distribution problems.

DETAILED DESCRIPTION OF THE INVENTION

Figure 1:
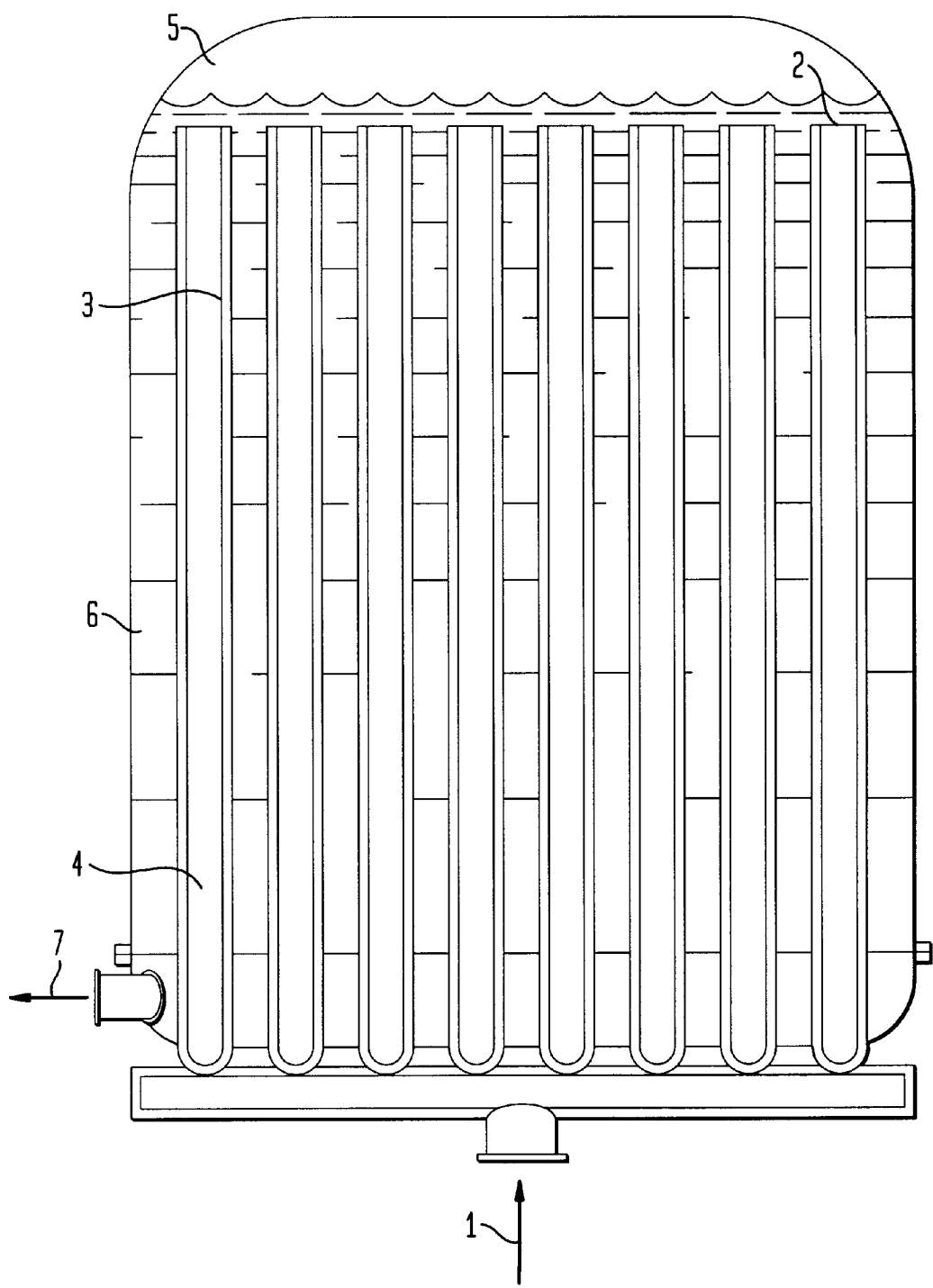
FIG. 1 is a cross-sectional view of a shell-and-tube type adsorbent vessel with monolith packed in the tubes and adsorbent beads in the shell.

The present invention provides for a process for separating a gas component from a gas mixture comprising subjecting the gas mixture to an adsorption process comprising the steps (a) passing the gas mixture through at least one adsorption zone containing an adsorbent composition which comprises a monolith adsorbent material and adsorbent beads at a selected temperature and pressure, thereby preferentially adsorbing the gas component from the gas mixture and (b) regenerating the adsorbent composition at a temperature higher than the selected temperature, at a pressure lower than the selected pressure or at both a temperature higher than the selected temperature and a pressure lower than the selected pressure.

In one embodiment of the present invention, an adsorbent bed is employed with a layer of adsorbent beads on top of a monolithic adsorbent layer. These layers can also be employed in either horizontal or vertical vessels. In an additional embodiment of the present invention, a second monolithic adsorbent layer can be employed on top of the layer of adsorbent beads. These configurations are based on an upflow feed. For example, in the first embodiment, when the feed direction is reversed, the adsorbent layers will also be reversed such that the monolithic adsorbent layer would be on top of the layer of adsorbent beads.

The material employed as the adsorbent beads will have different shapes and sizes, as well as different adsorption properties, when employed in a bed or layer in an adsorption zone. Two or more such differing materials will provide the benefits of smaller size particles and monolith structures while avoiding the difficulties of fluidization, flow distribution concerns and bed pressure drop.

The adsorbent zone preferably used in the present invention is an adsorber vessel which would contain a layer of a material in the form of beads. The beads would be solid, hollow or composite and would selectively adsorb the bulk components of air, oxygen or nitrogen, or would selectively remove impurities such as moisture, carbon dioxide or hydrocarbons from the feed stream.

The adsorbent zone may also contain a material in the form of a monolith with any type channel shapes which would be a material that selectively adsorbs oxygen or nitrogen from air or separate out contaminants such as moisture, carbon dioxide or hydrocarbons.

Lastly, the adsorbent zone may be a composite of the above two forms in which beads are coated on, packed inside of, or packed outside of the monolith material.

The adsorbent materials are selected from zeolites of the structural type EMT, FAU, LTA, MEL, MFI and ZSM-20. Most preferably, the at least one zeolite is either of the FAU or MEL and MFI structural types. In this embodiment, the primary microcrystalline particles of the zeolites referred to the FAU structural type are either of high aluminum content referred to as zeolites of the X type, or they are aluminum-deficient, i.e., of high silicon content, referred to as zeolites of the Y type. In general, the X type zeolites can be defined as conventional X type zeolite having a silicon-to-aluminum atomic ratio in the range of 1.2 to about 1.5, medium-silicon type X zeolite (MSX), defined as type X zeolite having a silicon-to-aluminum atomic ratio in the range of 1.1 to about less than about 1.2, or low-silicon type X zeolite (LSX), defined as type X zeolite having a silicon-to-aluminum atomic ratio of 0.9 to about less than about 1.1. Although the theoretical minimum silicon-to-aluminum atomic ratio in zeolite X is 1.0, apparent silicon-to-aluminum atomic ratios of type X zeolites as low as 0.9 have been measured, due to defects in the structure of the zeolite, the presence of impurities, such as occluded alumina and/or aluminates and/or errors in measurement. For purposes of this description, it is assumed that the minimum silicon-to-aluminum ratio of type X zeolite is 0.9. In preferred embodiments of the invention, the agglomerate contains zeolite X having a silicon-to-aluminum atomic ratio in the range of about 0.9 to less than about 1.2, i.e., a combination of MSX and LSX, and, in more preferred embodiments, it contains substantially only LSX, and it can be composed substantially of zeolite calcium LSX (CaLSX). In addition, the adsorbent may contain as the cation, lithium, or lithium and bivalent cation, or lithium and trivalent cation while being type X zeolite and have a Si/Al molar ratio of 0.9 to 1.25, preferably 1.0 to 1.1, and most preferably having an Si/Al ratio of less than 1.08.

On the other hand, aluminum-deficient FAU structural type zeolites, i.e., type Y zeolites, are well known. The Applicants will refer to them as to ultrastable Y type and dealuminated Y type zeolites. In another embodiment of this invention, the type Y zeolite has, preferably, a silicon-to-aluminum atomic ratio in the range of about 5 to about 300. More preferably, it has a silicon-to-aluminum atomic ratio in the range of about 10 to about 250. Most preferably, it has a silicon-to-aluminum atomic ratio in the range of about 20 to about 200.

The zeolites of the MFI and MEL structural types of this invention are preferably aluminum-deficient MFI and MEL zeolites that are also known as silicalite-1 and silicalite-2, respectively, or the related adsorbents are mixtures thereof. The low-silicon MEL and MFI structural type zeolites are also known as ZSM-11 and ZSM-5, respectively. Preferably, the type MFI and MEL zeolites have a silicon-to-aluminum atomic ratio in the range of about 15 to more than 1000. More preferably, they have a silicon-to-aluminum atomic ratio in the range of about 150 to about 1000. Most preferably, they have a silicon-to-aluminum atomic ratio in the range of about 500 to about 1000. The upper limit to the silicon-to-aluminum ratio, viz., the value 1000, has been set because of uncertainty margins as far as chemical analysis in this concentration range is concerned. It should be construed to cover all such obvious forms and modifications of materials that exceed this parameter value, as well.

The monolith arrangements may be manufactured by known state of the art processes. The beads or particles may be shaped by a series of methods into various geometrical forms. These methods include extrusion and pellet formation or bead formation. Aggregation may also be employed where chosen organic materials such as cellulose-derivatives could be added to the aggregate to improve mass transfer properties of the finished particle.

Reference will now be made to the figures which should be construed as exemplifying the invention and not limiting thereof.

The adsorbent vessel illustrated in FIG. 1 is a shell-and-tube adsorbent vessel. In an oxygen PSA process, air is fed from the bottom 1 to the tubes 2. Double-layered monoliths are packed in each of the tubes, where a monolithic adsorbent 3 that selectively adsorbs nitrogen is packed on top of a monolithic alumina 4 for moisture removal. The gas stream coming off the tubes is directed into a chamber filled with ceramic balls 5. The adsorbent beads 6 packed in the shell can be single or multiple layer of adsorbents with different particle sizes such as larger beads packed on top of smaller ones and of differing composition.

With the shell-and-tube type vessel design, the packing, sealing and activation of the smaller and standardized monolith modules in the tubes is easier than in a conventional vessel. Total vessel height is also reduced and allows for more flexibility in varying the cross-sectional area for the monolith and the beads. Heat transfer is also improved as a result of the heat exchange between the colder feed end inside the tubes and the warmer product end 7 outside of the tubes through the walls of the tubes. Packing monolith in the mass transfer (or tube side) zone where the flow rate is high will improve the mass transfer and reduce overall pressure drop. Larger adsorbent beads can also be packed into the equilibrium zone towards the bottom in the shell side, where the capacity is independent of particle size.

In a bulk adsorption process such as that of nitrogen from air, the flow of air feed is greatly reduced as it moves from the feed end to the product end of the adsorber. The vessel design as used in this invention will allow using higher feed velocity at the bottom. During the bed-to-bed equalization step, the fluidization problem for the sending bed was eliminated, and the fluidization at the bottom of the shell side of the receiving bed is minimized because of the upward flow and ceramic balls packed at the top.

Figure 2:
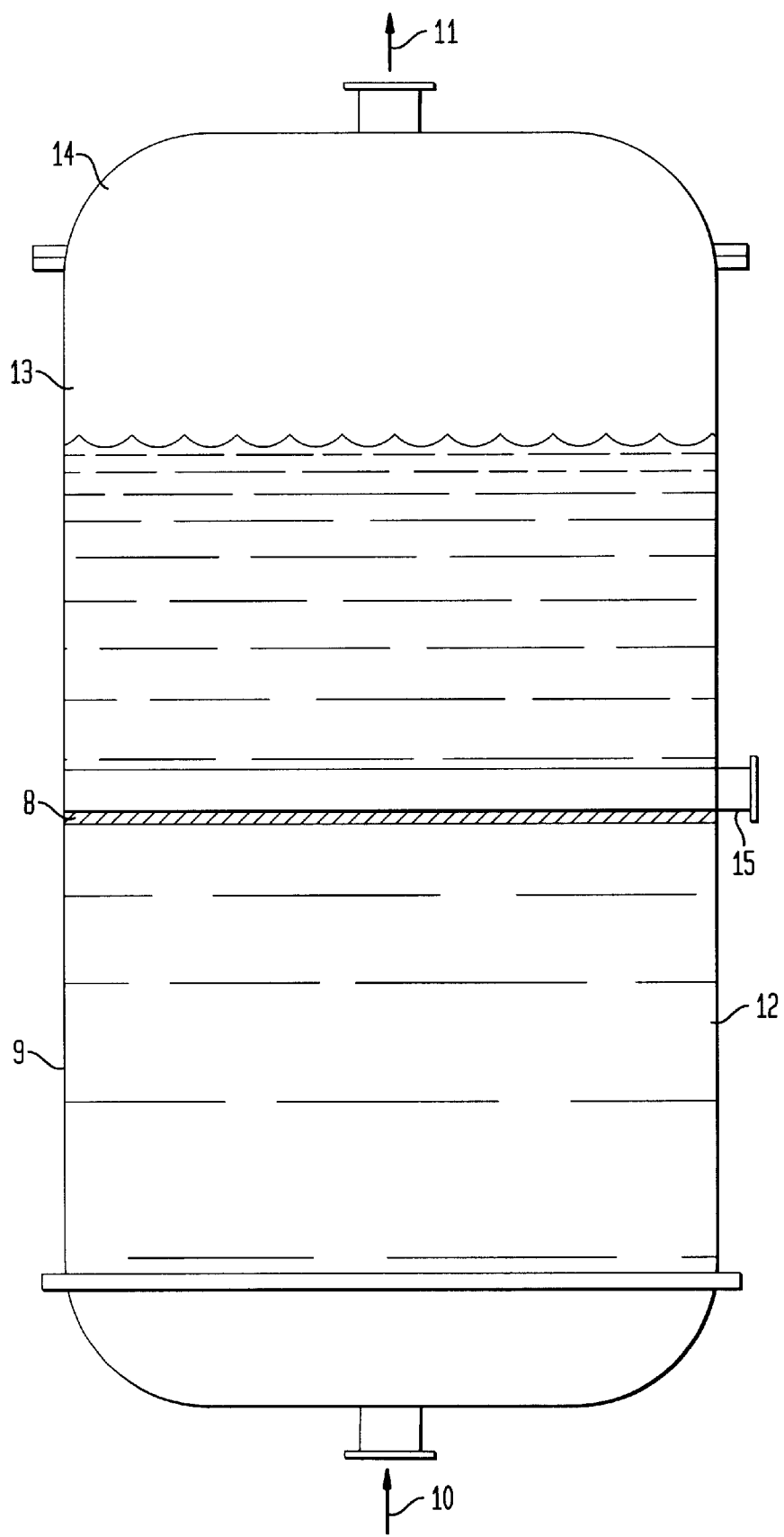
FIG. 2 is a cross-sectional view of an adsorber vessel with adsorbent beads packed into the top section and a monolith fluidized bed packed into the bottom section.

Regarding FIG. 2, a different vessel design is shown. The adsorbent vessel contains two sections, a top section of packed bed with adsorbent beads 13 and/or ceramic balls 14 and a bottom section of monolith fluidized bed, in which fine particles of adsorbent materials are suspended. The screen 8 on top of the monolith section prevents the fine particles 9 from being carried into the packed-bed section above it.

Feed gas is introduced into the vessel from the bottom 10 and product is withdrawn from the top 11. Each of the monolith channels 12 is a small fluidized bed. The particles inside the channels increase the overall adsorbent packing density and reduce the void space of the vessel. The vacuum line 15 located in the middle is used during the evacuation or blow down step.

In the adsorption process of the present invention, a component of a gas mixture that is more strongly adsorbed than other components of the gas mixture is separated from the other components by contacting the gas mixture with the adsorbent composition under conditions that effect adsorption of the strongly adsorbed component. The process can be pressure swing adsorption, including pressure-vacuum swing adsorption. Preferably this process is pressure swing adsorption.

When the adsorption process is PSA, the pressure envelope of the process may vary widely. This pressure envelope ranges from the pressure at which adsorption takes place, to that at which desorption of gas from the adsorbent material is executed. This desorption step is also known as regeneration. The pressure envelope depends on many circumstances that may be due to technical considerations caused by the specific adsorption properties of the gas mixture considered in juncture with the adsorbent properties, but also on economic parameters. Typically, if the PSA process is a PVSA one, desorption is performed at a sub-atmospheric pressure, the pressure envelope ranges usually from an absolute pressure in the range of about 5 bara for the adsorption step to about 0.05 bara for the regeneration step, but preferably from an absolute pressure in the range of about 3 bara to about 0.15 bara, and most preferably from an absolute pressure in the range of about 1.5 bara for the adsorption step to about 0.2 bara for the regeneration step. If no sub-atmospheric pressures are utilized in a PSA process, the desorption or regeneration pressure is usually preferred to be about 1 bara, but the adsorption pressure may again vary widely due to the specific adsorption properties of the gas components as exhibited for a given adsorbent material. Usually, the adsorption pressure is about 5 bara, but preferably about 3 bara, and, most preferably, about 2.5 bara.

In the non-cryogenic production of oxygen from air, the traditional packed bed structure consists of a layer of alumina to dry the air, a layer of zeolite to carry out the actual separation and a layer of ceramic balls to avoid particle movement at the bed surface. Although these layers could be replaced by one or more monolithic layers, the resulting low pressure drop creates a flow maldistribution.

In Example 1, a first layer of monolith was alumina-based for moisture removal, followed by a layer of nitrogen selective adsorbent based monolith. This allows for processing high flow rates which would otherwise cause fluidization of small particles. Immediately above these monolithic layers was a layer of 1 mm nitrogen selective adsorbent beads, which created the necessary pressure drop. Finally, an additional nitrogen selective adsorbent monolithic layer was placed on top to complete the separation and avoid the presence of small particles at the bed top, which would otherwise move due to high velocities during the pressurization and equalization steps.

EXAMPLE 1

Case 1 corresponds to a bed consisting of a layer of alumina beads followed by the zeolitic monolith. Low pressure drop and high maldistribution were observed. The flow maldistribution is determined from studies in which a tracer is injected at the inlet of the adsorbent layers. It is calculated as the percent difference between the residence times of the fastest and slowest tracers through these layers. Case 2 is the configuration proposed by the present invention. A relatively high pressure drop, which is within acceptable limits, and an excellent flow distribution were achieved. These results are shown in Table 1.

TABLE 1

|  | Layer 1 | Layer 2 | Layer 3 | Pressure Drop (mbar) | Flow Maldistribution (%) |
|---|---|---|---|---|---|
| Case 1 | 0.10 m of 3/16" alumina | 1.052 m of monolith |  | 6.5 | 65.7 |
| Case 2 | 0.31 m of monolith | 0.616 m of 1 mm beads | 0.31 m of monolith | 92 | 1.8 |

EXAMPLE 2

In this example the performance of three systems have been compared. Case 1 was the bead only bed, Case 2 was monolith only bed and Case 3 was a monolith/bead composite bed having the monolith layer at the feed end of the vessel, as per the present invention. A cyclic VSA process was performed using these three systems and their respective dynamic performance was measured. The performance data were then scaled up to predict the performance of a commercial size unit.

The results are given in Table 2.

TABLE 2

| | | | | Normalized Scale-up Data | |
|---|---|---|---|---|---|
| Case | System | Normalized Productivity | Normalized Oxygen Yield | Oxygen Production | Power Consumption |
| 1 | Beads | 1.00 | 1.00 | n/a | n/a |
| 2 | Monolith | 0.65 | 0.85 | 1.00 | 1.00 |
| 3 | Monolith-Bead | 1.18 | 1.01 | 1.17 | 0.85 |

It will be appreciated that it is within the scope of the present invention to utilize conventional equipment to monitor and automatically regulate the flow of gases within the system so that it can be fully automated to run continuously in an efficient manner.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for separating a gas component from a gas mixture comprising subjecting said gas mixture to an adsorption process comprising the steps:
    (a) passing the gas mixture through at least one adsorption zone containing an adsorbent composition which comprises a monolithic adsorbent layer and a layer of adsorbent beads at a selected temperature and pressure thereby preferentially adsorbing the gas component from the gas mixture; and
    (b) regenerating said adsorbent composition at a temperature higher than said selected temperature, at a pressure lower than said selected pressure or at both a temperature higher than said selected temperature and a pressure lower than said selected pressure.

2. The process as claimed in claim 1 wherein said adsorption process is a cyclic adsorption process.

3. The process as claimed in claim 2 wherein said cyclic adsorption process is selected from the group consisting of pressure swing, vacuum swing, and pressure-vacuum swing adsorption.

4. The process as claimed in claim 1 wherein said adsorption zone is an adsorber vessel.

5. The process as claimed in claim 4 wherein said beads are solid, hollow or composite geometric shape.

6. The process as claimed in claim 5 wherein said beads adsorb oxygen or nitrogen.

7. The process as claimed in claim 5 wherein said beads selectively adsorb moisture, carbon dioxide or hydrocarbons from said gas mixture.

8. The process as claimed in claim 5 wherein said adsorption zone contains a second monolithic layer.

9. The process as claimed in claim 8 wherein said second monolithic layer is on top of said layer of adsorbent beads.

10. The process as claimed in claim 5 wherein said beads are coated on, or packed inside of, or outside of said monolithic adsorbent layer.

11. The process as claimed in claim 10 wherein said beads are shaped by extrusion and pellet formation or bead formation.

12. The process as claimed in claim 10 wherein said beads are shaped through aggregation.

13. The process as claimed in claim 4 wherein said adsorber vessel is a shell-and-tube vessel.

14. The process as claimed in claim 13 wherein said adsorbent layer is packed in the shell of said shell-and-tube vessel and said monolithic adsorbent layer is packed in said tubes of said shell-and-tube vessel.

15. The process as claimed in claim 1 wherein said adsorbent composition comprises said monolithic adsorbent layer and said adsorbent bead layer in either horizontal or vertical vessels.

16. The process as claimed in claim 1 wherein said adsorbent is selected from the group consisting of the zeolite structural types EMT, FAU, LTA, MEL, MFI and ZSM-20 or mixtures thereof.

17. The process as claimed in claim 16 wherein said adsorbent is selected from the group consisting of the zeolite structural types FAU, MEL and MFI or mixtures thereof.

18. The process as claimed in claim 17 wherein said adsorbent is a zeolite structural type FAU with a silicon to aluminum atomic ratio of about 0.9 to 1.2.

19. The process as claimed in claim 16 wherein said zeolite structural type FAU is a calcium exchange zeolite with an exchange value in the range of 80 to 98%.

20. The process as claimed in claim 16 wherein said adsorbent is a zeolite structural type FAU with a silicon to aluminum atomic ratio of about 20 to about 200.

21. The process as claimed in claim 16 wherein said adsorbent is a zeolite structural type MFI with a silicon to aluminum elemental ratio of about 500 to about 1000.

22. The process as claimed in claim 1 wherein said gas component is nitrogen and said gas mixture is air.

* * * * *